July 16, 1963
G. REUTER
3,098,205
BUTT JOINT FOR UNWELDABLE VIBRATORY BODIES
Filed Aug. 20, 1959
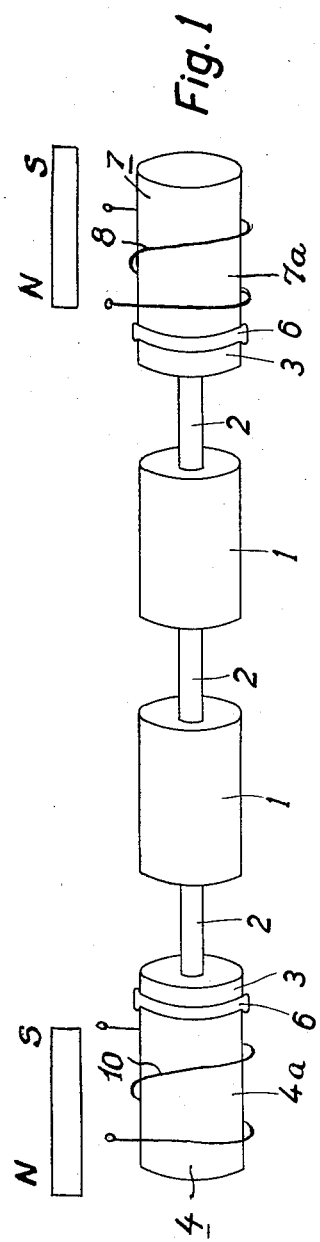
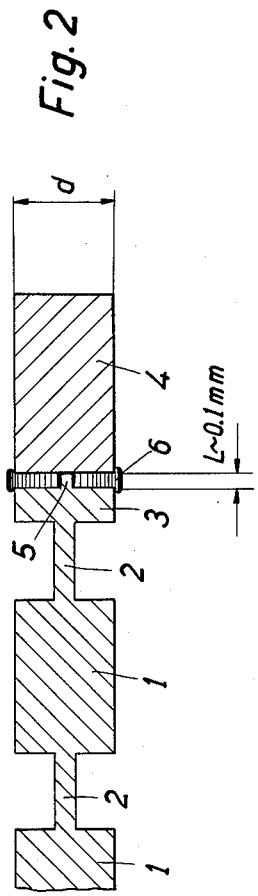
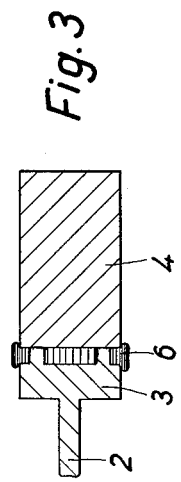
Inventor:
GÜNTHER REUTER
By
Patent Agent

United States Patent Office 3,098,205
Patented July 16, 1963

3,098,205
BUTT JOINT FOR UNWELDABLE VIBRATORY BODIES
Günther Reuter, Ulm (Danube), Germany, assignor to Telefunken G.m.b.H., Berlin, Germany
Filed Aug. 20, 1959, Ser. No. 835,067
Claims priority, application Germany Aug. 23, 1958
2 Claims. (Cl. 333—71)

The present invention relates to surface connections for two vibratory bodies made of materials which cannot be welded to one another, said bodies being energized by mechanical oscillations at high frequencies. The invention is particularly directed to the problem of bonding of a magnetostrictive transducer of ferrite to a vibratory filter body of steel to form a mechanical frequency filter for high frequencies in the range of several hundred kilocycles.

The known electromechanical filters generally comprise an electromechanical transducer at the input, said transducer transforming electrical oscillations into mechanical oscillations and being preferably made of ferrite, and said filters further comprising mechanical resonators suitably made of steel and mechanically interconnected and coupled to the transducers via rod-like coupling elements, and said filters further comprising an electromechanical transducer at the output of the filter for converting the mechanical oscillations of the resonators into electrical oscillations, the output transducers, generally, being similar to the input transducers.

The mechanical resonators and the coupling elements in such filters may be made of a single piece, so that difficulties cannot occur at the junctions between the resonators and the coupling elements, or they may, as mentioned, comprise several pieces, wherein the joints of the individual parts or pieces are provided at locations where no great mechanical stresses will occur at the frequencies to be transmitted. In such filters, difficulties are encountered at the junction between an electromechanical ferrite transducer and a steel filter body because, at such junctions, no welding connections can be employed as at the other joints.

In the known filter assemblies of the above-mentioned types, the junctions are obtained by cementing or gluing, or by means of screws. A junction employing screws has the disadvantage that it renders the filter difficult to tune to the prescribed frequencies, said tuning being possible only after joining of the parts. The mentioned gluing or cementing of joints, for example, by means of a curable synthetic cement, have proven unreliable under strong continuous stress caused by the mechanical oscillations.

It is an object of the present invention to use a joining method known per se in the electron tube art, wherein the bodies to be joined are bonded with one another by a glass mass of suitable composition. In this case, a difficulty arises attributable to the need for providing a certain minimum thickness in the layer of the glass mass to prevent breaking of the joint after cooling of the body.

It is another object of the invention to provide a butt joint of considerable area between two bodies of different and non-weldable materials, said bodies being energized by mechanical oscillations at high frequencies, wherein a glaze is used as a joining material between the surfaces to be bonded, and wherein at least one of said surfaces has at least one projection used to gauge the thickness of the glaze layer and maintain it at a certain value sufficient to absorb the mechanical stresses due to great temperature variations during manufacture.

In order to obtain a superior joint, the glass flux is heated to about 650° C. and then introduced between the surfaces to be joined. When the two bodies are pressed together, the freely flowing glass mass will be squeezed out at the edge, so that a very thin glass layer remains between the two bodies. The glass solidifies at about 450° C. and, during the further cooling to room temperature, stresses occur in the glass layer caused by differences in shrinkage of the steel filter body and the ferrite transducer body, due to their mutually different temperature coefficients. If the glass layer is very thin, these mechanical stresses may be so great that they will destroy the joint. A minimum thickness of the glass layer is assured by the projections provided on at least one of the two bodies to be joined in accordance with this invention, said minimum thickness being sufficient to absorb the mechanical stresses occurring during cooling, so that breaking of the joint does not take place. In this case, the stress gradient is distributed across the largest thickness of the glass layer in such a manner, that overstressing will not occur at any location.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 illustrates in perspective a first embodiment of a filter according to the invention, showing a ferrite transducer to be energized by longitudinal oscillations in combination with mechanical filter bodies vibrating with the same kind of oscillations, and comprising λ/2 resonators and λ/4 coupling elements.

FIGURE 2 is an enlarged longitudinal section through a part of the filter assembly shown in FIGURE 1.

FIGURE 3 is a partial longitudinal section similar to that of FIGURE 2, showing a modified embodiment of the invention.

Referring in detail to the drawing, FIGURE 1 illustrates a filter body comprising cylindrical resonators 1 of larger cross section and similar cylindrical coupling elements 2 of smaller cross section interconnecting the resonators 1 and on the same axis therewith. The two coupling elements at the ends are connected to disks 3 of the same material. The resonators 1, the coupling elements 2 and the disks 3 can be made of a single piece, for example, on a lathe. It is also possible to make them of several parts which are joined by screws or welds. Electromechanical transducers 4 and 7, for example of ferrite, are secured to the disks 3 at larger surface-area joints in accordance with the invention.

The transducers 4 and 7 also include the magnetizing coil 8 for the input transducer 7 and the winding 10 for the electric output transducer 4. Each of the disks 3 which, for example, may have a diameter of $d=3$ millimeters, has a projection 5 at the surfaces to be joined to the cores 4a and 7a of the transducers 4 and 7, respectively, said projection having a length of for example, $L=0.1$ millimeter. The projection 5 is suitably provided in the center of the respective surfaces. As a result of this, the two surfaces to be joined cannot engage one another directly, rather they will be spaced by the minimum distance of 0.1 mm. The gap between the two adjacent surfaces is filled with a glass flux 6.

Suitable flux materials are known in the electron tube art.

The projection 5 establishes a minimum thickness of 0.1 mm. of the flux layer to assure that the tensions caused by the different rates of shrinking of the steel and of the ferrite can be absorbed without overstressing the glass which could cause breaking of the joint.

While in the embodiment of FIGURE 2 only a single projection 5 is provided, several such projections can be used, as shown in FIGURE 3, if it is necessary to prevent tilting of the surfaces to be joined with respect to one another. Generally, a single projection, as shown in FIGURE 2, will suffice if tilting of the parts to be joined is prevented by precisely guiding these parts and thereby assuring that the joining mass layer has the same thickness at all locations.

This type of joint can be used for joining other non-weldable materials, especially where the joint is to be subjected to considerable mechanical stresses.

I claim:

1. In a mechanical frequency filter system, the combination which comprises a ferrite transducer body and a steel resonator body, said bodies having, respectively, opposed surfaces of considerable area, there being a butt joint between said bodies which butt joint includes at least one projection extending from at least one of said surfaces toward the other surface and a bonding glaze mass fused to both surfaces around said projection, said projection being of such length as to limit the approach of one surface toward the other during forming of the bond to assure adequate thickness of said mass to absorb mechanical stresses due to large temperature changes during manufacture of the system.

2. The combination defined in claim 1 wherein said one surface is that of said steel resonator body, said projection extending outwardly from its butt joint surface and being located in the center thereof.

References Cited in the file of this patent

UNITED STATES PATENTS

| | | |
|---|---|---|
| 2,122,994 | Southgate | July 5, 1938 |
| 2,396,320 | Gaudenzo et al. | Mar. 12, 1946 |
| 2,604,569 | Denneen | July 22, 1952 |
| 2,753,529 | Maron et al. | July 3, 1956 |
| 2,810,888 | George et al. | Oct. 22, 1957 |
| 2,949,376 | Comer | Aug. 16, 1960 |